(12) United States Patent
Haberl et al.

(10) Patent No.: US 10,081,347 B2
(45) Date of Patent: Sep. 25, 2018

(54) SMART NOTIFICATION SYSTEMS FOR WEARABLE DEVICES

(71) Applicant: Toyota Motor Engineering & Manufacturing North America, Inc., Erlanger, KY (US)

(72) Inventors: Samuel T. Haberl, Ann Arbor, MI (US); Charan Lota, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 15/281,664

(22) Filed: Sep. 30, 2016

(65) Prior Publication Data

US 2017/0015296 A1 Jan. 19, 2017

Related U.S. Application Data

(63) Continuation of application No. 14/552,903, filed on Nov. 25, 2014, now Pat. No. 9,488,980.

(51) Int. Cl.
*G05D 23/00* (2006.01)
*B60W 10/30* (2006.01)
(Continued)

(52) U.S. Cl.
CPC ............ *B60W 10/30* (2013.01); *B60W 40/02* (2013.01); *B60W 50/10* (2013.01); *G05D 1/0016* (2013.01);
(Continued)

(58) Field of Classification Search
None
See application file for complete search history.

(56) References Cited

U.S. PATENT DOCUMENTS 6,345,767 B1* 2/2002 Burrus, IV ......... B60H 1/00735
236/1 R
6,619,835 B2* 9/2003 Kita ..................... A44C 5/0015
368/10

(Continued)

FOREIGN PATENT DOCUMENTS

JP 2009214591 9/2009

OTHER PUBLICATIONS

Bhanu Jamwal, "BMW Shows Off Connected Galaxy Gear Smartwatch App for Monitoring Cars"; http://thenextdigit.com/3932/bmw-shows-connected-galaxy-gear-smartwatch-app-monitoring-cars; publication date—Jan. 10, 2014.

(Continued)

*Primary Examiner* — Jonathan M Dager
(74) *Attorney, Agent, or Firm* — Dinsmore & Shohl LLP

(57) ABSTRACT

According to the embodiments described herein, a smart notification system can include a vehicle, a mobile communication device, and a wearable processing device. A wearable processor or the wearable processing device, a mobile processor of the mobile communication device, a vehicular processor of the vehicle, or a combination thereof can execute machine readable instructions to monitor ambient conditions of the vehicle with a sensor. A notification can be provided upon a wearable display of the wearable processing device. The notification can be indicative of the ambient conditions of the vehicle. A command can be detected with physical input of the wearable processing device. A command signal can be received with vehicle communication hardware of the vehicle. The command signal can be indicative of the command detected by the physical input of the wearable processing device.

20 Claims, 4 Drawing Sheets

(51) Int. Cl.
  *G05D 1/00* (2006.01)
  *B60W 50/10* (2012.01)
  *G07C 5/08* (2006.01)
  *G06F 3/01* (2006.01)
  *G06F 1/16* (2006.01)
  *B60W 40/02* (2006.01)
  *B60W 50/00* (2006.01)
  *G07C 5/00* (2006.01)

(52) U.S. Cl.
  CPC .............. *G06F 1/163* (2013.01); *G06F 3/017* (2013.01); *G07C 5/0808* (2013.01); *B60W 2050/0064* (2013.01); *B60W 2550/12* (2013.01); *G07C 5/008* (2013.01)

(56) References Cited

U.S. PATENT DOCUMENTS

| | | | | |
|---|---|---|---|---|
| 7,823,399 | B2* | 11/2010 | Egawa | B60H 1/00735 165/204 |
| 8,006,508 | B2* | 8/2011 | Kojima | B60H 1/0065 180/65.27 |
| 8,275,505 | B2* | 9/2012 | Kumagai | B60H 1/00642 701/22 |
| 8,279,716 | B1* | 10/2012 | Gossweiler, III | H04M 1/72552 368/10 |
| 8,341,971 | B2* | 1/2013 | Oyobe | B60H 1/004 236/10 |
| 8,494,765 | B2 | 7/2013 | Konet et al. | |
| 8,670,897 | B1* | 3/2014 | Ralson | G06F 11/3013 701/36 |
| 8,672,022 | B2* | 3/2014 | Ostermeier | B60H 1/00778 165/202 |
| 8,725,842 | B1* | 5/2014 | Al-Nasser | G04G 17/08 709/219 |
| 8,811,900 | B2* | 8/2014 | Kirsch | H04M 1/6091 340/426.16 |
| 8,868,254 | B2* | 10/2014 | Louboutin | H04W 4/021 701/2 |
| 8,931,547 | B2* | 1/2015 | Yen | B60H 1/00392 165/202 |
| D726,678 | S * | 4/2015 | Park | D14/138 R |
| 9,062,617 | B2* | 6/2015 | Mauti, Jr. | F02D 29/02 |
| 9,085,216 | B2* | 7/2015 | Takehisa | B60H 1/00742 |
| 9,183,709 | B2* | 11/2015 | Avrahami | G08B 5/36 |
| 9,191,482 | B1* | 11/2015 | Sidbury | H04M 1/04 |
| 9,199,609 | B2* | 12/2015 | Rasal | B60R 25/209 |
| 9,327,580 | B2* | 5/2016 | Sunaga | B60H 1/0075 |
| 9,330,062 | B2* | 5/2016 | Thurow | G06F 17/00 |
| 9,416,762 | B2* | 8/2016 | Flick | B60W 10/02 |
| 9,862,246 | B2* | 1/2018 | Kikuchi | B60H 1/00778 |
| 2004/0176880 | A1* | 9/2004 | Obradovich | B60G 17/0195 701/1 |
| 2004/0194479 | A1* | 10/2004 | Umebayashi | B60H 1/00642 62/126 |
| 2005/0046953 | A1* | 3/2005 | Repetto | G02B 27/017 359/630 |
| 2005/0192724 | A1* | 9/2005 | Hendry | B60H 1/00735 701/36 |
| 2005/0225175 | A1* | 10/2005 | Maehara | B60W 10/06 307/10.1 |
| 2005/0248542 | A1* | 11/2005 | Sawanobori | G06F 3/04883 345/173 |
| 2006/0073851 | A1* | 4/2006 | Colando | G04G 9/0064 455/566 |
| 2008/0117079 | A1* | 5/2008 | Hassan | B60R 25/045 340/901 |
| 2008/0287074 | A1* | 11/2008 | Grunhold | H04M 1/6091 455/90.2 |
| 2009/0064695 | A1* | 3/2009 | Kojima | B60H 1/0065 62/230 |
| 2010/0072290 | A1* | 3/2010 | Dage | B60H 1/00657 236/51 |
| 2010/0132388 | A1* | 6/2010 | Oyobe | B60H 1/004 62/157 |
| 2010/0206957 | A1* | 8/2010 | Vyas | B60H 1/00428 236/46 R |
| 2010/0235046 | A1* | 9/2010 | Proefke | B60H 1/00642 701/36 |
| 2010/0305807 | A1* | 12/2010 | Basir | B60R 16/0373 701/31.4 |
| 2011/0071734 | A1* | 3/2011 | Van Wiemeersch | G08C 17/02 701/49 |
| 2011/0086668 | A1* | 4/2011 | Patel | G08C 17/02 455/556.1 |
| 2011/0205851 | A1* | 8/2011 | Harris | G04G 9/0064 368/14 |
| 2011/0219427 | A1* | 9/2011 | Hito | G06F 21/00 726/3 |
| 2011/0225279 | A1* | 9/2011 | Kalhous | B60H 1/00657 709/223 |
| 2011/0256904 | A1* | 10/2011 | Simmons | B60R 25/00 455/556.1 |
| 2012/0086395 | A1* | 4/2012 | Kim | B60L 11/1838 320/109 |
| 2012/0101659 | A1* | 4/2012 | Kim | B60H 1/00257 701/2 |
| 2012/0115446 | A1* | 5/2012 | Gautama | G08C 17/02 455/414.1 |
| 2012/0116608 | A1* | 5/2012 | Park | B60H 1/00657 701/2 |
| 2012/0303178 | A1* | 11/2012 | Hendry | B60R 16/037 701/2 |
| 2013/0146659 | A1* | 6/2013 | Zhou | G06Q 20/355 235/380 |
| 2013/0151132 | A1* | 6/2013 | Harumoto | F02N 11/0807 701/113 |
| 2013/0238168 | A1* | 9/2013 | Reyes | B64C 39/024 701/2 |
| 2013/0265178 | A1* | 10/2013 | Tengler | H04W 4/00 340/989 |
| 2013/0271074 | A1* | 10/2013 | Federico | G06F 7/00 320/109 |
| 2014/0081481 | A1* | 3/2014 | Nishida | B60H 1/00771 701/2 |
| 2014/0100716 | A1* | 4/2014 | Kawai | B60L 11/14 701/2 |
| 2014/0114499 | A1* | 4/2014 | Perner | H04W 4/12 701/2 |
| 2014/0143785 | A1* | 5/2014 | Mistry | G06F 1/163 718/104 |
| 2014/0179225 | A1* | 6/2014 | Teng | H04M 1/72522 455/41.1 |
| 2014/0195108 | A1* | 7/2014 | Schumacher | G07C 5/008 701/36 |
| 2014/0288435 | A1* | 9/2014 | Richards | A61B 5/02427 600/479 |
| 2014/0330453 | A1* | 11/2014 | Nakagawa | B60H 1/00428 701/2 |
| 2015/0120151 | A1* | 4/2015 | Akay | B60R 25/24 701/49 |
| 2015/0134207 | A1* | 5/2015 | Park | E05F 15/40 701/49 |
| 2015/0210287 | A1* | 7/2015 | Penilla | B60W 40/08 701/49 |
| 2015/0266377 | A1* | 9/2015 | Hampiholi | B60K 35/00 455/466 |
| 2015/0283914 | A1* | 10/2015 | Malone | B60H 1/004 701/49 |
| 2017/0016266 | A1* | 1/2017 | Van Wiemeersch | E05F 15/71 |

OTHER PUBLICATIONS

BMW Blog; "BMW i App for the New Apple Watch"; http://bmwblog.kinja.com/bmw-i-app-for-the-new-apple-watch-1632560313; publication date—Sep. 9, 2014.

(56) References Cited

OTHER PUBLICATIONS

Glass App Source; "Nissan to Unveil Glass-Like Wearable 3E Later This Month"; http://www.glassappsource.com/google-glass/nissan-unveil-glass-like-wearable-3e-later-month.html; publication date—Nov. 13, 2013.
GPS Innovations; "smartWATCH"; http://www.gpsinnovations.com.au/portfolio/smartwatch; accessed on Sep. 10, 2014.
Non-Final Office Action dated Feb. 25, 2016 for U.S. Appl. No. 14/552,903, filed Nov. 25, 2014.
Response dated May 24, 2016 to Non-Final Office Action dated Feb. 16, 2012 for U.S. Appl. No. 14/552,903, filed Nov. 25, 2014.
Notice of Allowance dated Aug. 1, 2016 for U.S. Appl. No. 14/552,903, filed Nov. 25, 2014.

\* cited by examiner

SMART NOTIFICATION SYSTEMS FOR WEARABLE DEVICES

CROSS-REFERENCE TO RELATED APPLICATIONS

This application is a continuation of U.S. patent application Ser. No. 14/552,903 filed Nov. 25, 2014.

TECHNICAL FIELD

The present specification generally relates to smart notification systems for wearable devices and, more specifically, to smart notification systems for providing notifications to a wearable device from a vehicle.

BACKGROUND

Many vehicles come equipped with heating ventilation and air conditioning (HVAC) systems that are intended to improve the comfort of vehicle occupants. In extreme conditions such as, for example, hot days or cold days, the HVAC system can struggle to perform adequately to adjust the conditions of the vehicle in a timely manner. Yet, it can be difficult to remotely monitor the conditions of the vehicle and determine the appropriate time for operating the HVAC system.

Accordingly, a need exists for alternative smart notification systems for providing notifications to a wearable device from a vehicle.

SUMMARY

In one embodiment, a smart notification system can include a vehicle, a mobile communication device, and a wearable processing device. The vehicle can include a vehicular processor communicatively coupled to a sensor and vehicle communication hardware. The mobile communication device can include a mobile processor communicatively coupled to mobile communication hardware. The mobile communication hardware can be communicatively coupled to the vehicle communication hardware. The wearable processing device can include a wearable component coupled to an electronic component. The electronic component of the wearable processing device can include a wearable processor communicatively coupled to wearable communication hardware, a wearable display, and physical input. The wearable communication hardware can be communicatively coupled to the mobile communication hardware. The wearable processor, the mobile processor, the vehicular processor, or a combination thereof can execute machine readable instructions to monitor ambient conditions of the vehicle with the sensor. A notification can be provided upon the wearable display of the wearable processing device. The notification can be indicative of the ambient conditions of the vehicle. A command can be detected with the physical input of the wearable processing device. A command signal can be received with the vehicle communication hardware. The command signal can be indicative of the command detected by the physical input of the wearable processing device.

In another embodiment, a smart notification system can include a vehicle and a wearable processing device. The vehicle can include a vehicular processor communicatively coupled to a sensor and vehicle communication hardware. The wearable processing device can include a watch band coupled to a watch face, and an electronic component incorporated into the watch face. The electronic component of the wearable processing device can include a wearable processor communicatively coupled to wearable communication hardware, a wearable display, and physical input. The wearable communication hardware can be communicatively coupled to the vehicle communication hardware. The wearable processor, the vehicular processor, or both executes machine readable instructions to monitor ambient conditions of the vehicle with the sensor. A notification can be provided upon the wearable display of the wearable processing device. The notification can be indicative of the ambient conditions of the vehicle. A command can be detected with the physical input of the wearable processing device. A command signal can be received with the vehicle communication hardware. The command signal can indicative of the command detected by the physical input of the wearable processing device.

In yet another embodiment, a smart notification system can include a vehicle and a wearable processing device. The vehicle can include a vehicular processor communicatively coupled to a sensor and vehicle communication hardware. The wearable processing device can include an eye glass frame, and an electronic component coupled to the eye glass frame. The electronic component of the wearable processing device can include a wearable processor communicatively coupled to wearable communication hardware, a wearable display, and physical input. The wearable communication hardware can be communicatively coupled to the vehicle communication hardware. The wearable processor, the vehicular processor, or both can execute machine readable instructions to monitor ambient conditions of the vehicle with the sensor. A notification can be provided upon the wearable display of the wearable processing device. The notification can be indicative of the ambient conditions of the vehicle. A command can be detected with the physical input of the wearable processing device. A command signal can be received with the vehicle communication hardware. The command signal can be indicative of the command detected by the physical input of the wearable processing device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
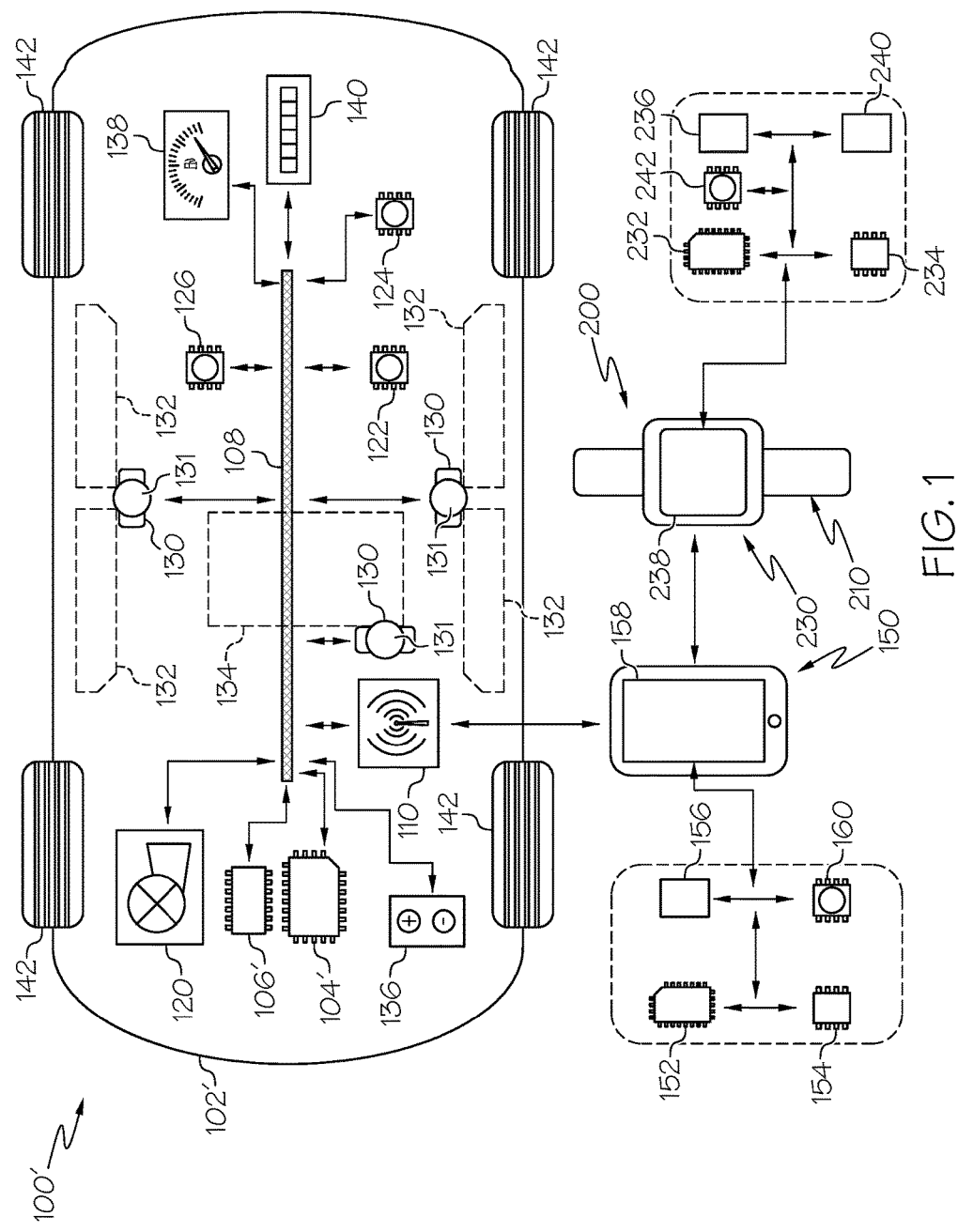
FIG. 1 schematically depicts a smart notification system according to one or more embodiments shown and described herein.

FIG. 1 generally depicts one embodiment of a system for providing smart notifications from a vehicle. The system generally comprises a vehicle having a sensor for monitoring ambient conditions of the vehicle and a wearable processing device that is directly or indirectly communicatively coupled to the vehicle. Accordingly, the wearable processing device can be configured to provide notifications indicative of the ambient conditions of the vehicle, and the vehicle can be configured to receive command signals indicative of a command received by the wearable processing device. In some embodiments, the vehicle can be configured to alter the ambient conditions in response to the command signal. Various embodiments of the smart notification system and the operation of the smart notification system will be described in more detail herein.

Referring now to FIG. 1, an embodiment of a smart notification system 100 configured to provide notifications from a vehicle 102 to a wearable processing device 200, is schematically depicted. The smart notification system 100 can comprise a vehicle 102 such as, for example, an automobile. It is noted that, while the vehicle 102 is depicted as an automobile, the vehicle 102 may be any passenger vehicle such as, for example, a terrestrial, aquatic, and/or airborne vehicle. The vehicle 102 can comprise a vehicular processor 104 communicatively coupled to vehicular memory 106. As used herein, the term "processor" can mean any device capable of executing machine readable instructions. Accordingly, each processor may be a controller, an integrated circuit, a microchip, a computer, or any other computing device. The term "memory," as used herein, can mean any device capable of storing machine readable instructions such as, for example, RAM, ROM, flash memory, hard drive devices, or the like.

Embodiments of the present disclosure can comprise machine readable instructions for automatically implementing methods that comprise logic or algorithms written in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively, the logic or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, or as a combination of hardware and software components.

The vehicle 102 can comprise a communication path 108 that provides data interconnectivity between various vehicle modules disposed throughout the vehicle 102. Accordingly, the communication path 108 can communicatively couple any number of vehicle modules with one another, and can allow the vehicle modules to operate in a distributed computing environment. For example, each of the vehicle modules can operate as a node that may send and/or receive data. In some embodiments, the communication path 108 can comprise conductive material that permits the transmission of electrical data signals to processors, memories, sensors, and actuators throughout the vehicle 102. Alternatively or additionally, the communication path 108 can be a vehicle bus, such as for example a LIN bus, a CAN bus, a VAN bus, and the like. Alternatively or additionally, the communication path 108 can comprise wireless communication components, optical waveguides, or the like. As used herein, the term "communicatively coupled" can mean that the components are capable of exchanging data signals with one another such as, for example, electrical signals via conductive medium, electromagnetic signals via air, optical signals via optical waveguides, and the like. Additionally, it is noted that the term "signal" can mean a waveform (e.g., electrical, optical, magnetic, mechanical or electromagnetic), such as DC, AC, sinusoidal-wave, triangular-wave, square-wave, vibration, and the like, capable of traveling through a medium.

Referring still to FIG. 1, the vehicle 102 can comprise vehicle communication hardware 110 for exchanging data signals. The vehicle communication hardware 110 can be communicatively coupled (generally depicted in FIG. 1 as double arrowed lines) to the communication path 108. Accordingly, the vehicle communication hardware 110 can transmit signals indicative of any signal provided via the communication path. For the purpose of defining and describing the embodiments provided herein, it is noted that the term "indicative" of can mean that a signal is encoded to correspond to another signal or a data instance. Accordingly, a first signal or a data instance can be transformed into a second signal that corresponds to the first signal or the data instance. Alternatively or additionally, the first signal can be retransmitted without transformation as the second signal, which would be indicative of the first signal.

The vehicle communication hardware 110 can comprise any device capable of transmitting and/or receiving data via a network. Accordingly, vehicle communication hardware 110 can comprise an antenna and/or other communication transceiver for sending and/or receiving any wired or wireless communication. For example, vehicle communication hardware 110 can comprise a modem, LAN port, wireless fidelity (Wi-Fi) card, WiMax card, mobile communications hardware, near-field communication hardware, satellite communication hardware and/or any wired or wireless hardware for communicating with other devices. Accordingly, the vehicle communication hardware 110 can communicatively couple the vehicle 102 to a device via wire, via a wide area network, via a local area network, via a personal area network, via a cellular network, via a satellite network and the like. Suitable local area networks may include wired ethernet and/or wireless technologies such as, for example, Wi-Fi. Suitable personal area networks may include wireless technologies such as, for example, IrDA, Bluetooth, Wireless USB, Z-Wave, ZigBee, and the like. Alternatively or additionally, suitable personal area networks may include wired computer buses such as, for example, USB and FireWire. Suitable cellular networks include, but are not limited to, technologies such as GPRS, EDGE, LTE, WiMAX, UMTS, CDMA, and GSM. Thus, any components of the vehicle 102 can utilize one or more components of the vehicle communication hardware 110 to transmit signals over the Internet or World Wide Web.

The vehicle 102 can comprise a heating ventilation and air conditioning (HVAC) system 120 that monitors ambient conditions of the vehicle 102 and adjust the ambient conditions within the vehicle 102. For example, the HVAC system 120 can be configured to provide conditioned air throughout a passenger compartment of the vehicle 102. As used herein, the term "conditioned air" can mean air received from outside of the vehicle 102 that has been modified by the HVAC system 120 such as, for example, via heating, cooling, pressurizing, altering humidity, or the like. The HVAC system 120 can deliver the conditioned air throughout the vehicle 102 using, for example, a blower fan, ducting, and vents. Alternatively or additionally, the HVAC system 120 can be configured to deliver unconditioned air throughout the vehicle 102 using the blower fan, ducting, and vents. The HVAC system 120 can comprise a processor for controlling the HVAC system 120. Alternatively or additionally, the HVAC system 120 can be controlled by the vehicular processor 104. Accordingly, the HVAC system 120 can be communicatively coupled to the communication path 108.

According to the embodiments described herein, the vehicle 102 can comprise one or more sensors for monitoring ambient conditions of the vehicle 102, i.e., conditions of the vehicle 102, the environment surrounding the vehicle 102, or combinations thereof. In some embodiments, the vehicle 102 can comprise one or more temperature sensors 122 for monitoring ambient temperatures of the vehicle 102. Specifically, the one or more temperature sensors 122 can be configured to detect the temperature of air within the passenger compartment of the vehicle 102, the temperature of air at an engine intake, the temperature of air provided to the HVAC system 120, the temperature of air within a duct the temperature of the HVAC system 120, the temperature of air surrounding the vehicle 102, or combinations thereof. The one or more temperature sensors 122 can comprise a thermistor, a resistance temperature detector, a thermocouple, or the like. The one or more temperature sensors 122 can be communicatively coupled to the communication path 108. Accordingly, the temperatures detected by the one or more temperature sensors 122 can be provided as vehicle temperature signals to the communication path 108 or any component communicatively coupled thereto. It is noted that the term "sensor," as used herein, can mean a device that measures a physical quantity and converts it into a data signal, which is correlated to the measured value of the physical quantity, such as, for example, an electrical signal, an electromagnetic signal, an optical signal, a mechanical signal, or the like.

Referring still to FIG. 1, the vehicle 102 can comprise a humidity sensor 124 capable of detecting moisture in the air surrounding the vehicle 102. Accordingly, the humidity sensor 124 can comprise a rain sensor that measures infrared light to detect water droplets, a hygrometer for detecting relative humidity, a water-sensitive switch, or the like. The humidity sensor 124 can be communicatively coupled to the communication path 108. Accordingly, the moisture detected by the humidity sensor 124 can be provided as vehicle humidity signals to the communication path 108 or any component communicatively coupled thereto.

The vehicle 102 can comprise a light sensor 126 for detecting optical energy (e.g., sun light) directed towards the vehicle 102. As used herein, the phrase "light sensor" can mean a device that measures light intensity such as, for example, an optical detector, a light dependent resistor, a photodiode, a phototube and the like. The light sensor 126 can be communicatively coupled to the communication path 108. Accordingly, the light intensity detected by the light sensor 126 can be provided as vehicle light signals to the communication path 108 or any component communicatively coupled thereto.

In the alternative to or in addition to the HVAC system 120, the vehicle 102 can comprise further components for adjusting the ambient conditions within the vehicle 102. In some embodiments, the vehicle 102 can comprise one or more window actuators 130 configured to open windows 132 or a sunroof 134 of the vehicle 102. The window actuator 130 can be any type of motorized device that converts an energy source into motion that urges a window 132 or a sunroof 134 into motion. In some embodiments, the window actuator 130 can be an electromechanical device that converts electrical energy into motion via a motor. Accordingly, each window actuator 130 can be communicatively coupled to the communication path 108. Each window actuator 130 can be provided an actuator control signal via the communication path 108, and can operate in accordance to the actuator control signal. The actuator control signal can be provided by any component communicatively coupled to the communication path 108 such as, for example, the vehicular processor 104 or window control switches.

The vehicle 102 can comprise a window position sensor 131 for detecting the position of the windows 132, the sunroof 134, or both. The window position sensor 131 can be any device capable of detecting position that can be correlated to a relative amount of open/closed the windows 132, the sunroof 134, or both such as, for example, an encoder, a switch, or the like. In some embodiments, the window position sensor 131 can be configured as an encoder in operable coupling with the window actuator 130. The window position sensor 131 can be communicatively coupled to the communication path 108. Accordingly, the position detected by the window position sensor 131 can be provided as window position signals to the communication path 108 or any component communicatively coupled thereto.

Referring still to FIG. 1, the vehicle 102 can be configured to monitor vehicle information relating to the engine, preferred and current tire pressure, model year, mileage or the like. Based on the vehicle information, the vehicle 102 can be configured to determine scheduled maintenance, issues with the vehicle 102 (such as low tire pressure) and needed repairs. Accordingly, the vehicle 102 can comprise a battery sensor 136 for measuring electrical parameters of a battery of the vehicle 102. The battery sensor 136 can be any sensor suitable for detecting electrical parameters such as, for example, voltage, amperage, state of charge, depth of charge or the like. Accordingly, in embodiments where the vehicle 102 is configured as a battery electric vehicle (BEV), hybrid vehicle (HEV), or plug-in hybrid electric vehicle (PHEV), the battery sensor 136 can operate as battery condition monitor that detects the functional range of the battery. The battery sensor 136 can be communicatively coupled to the communication path 108. Accordingly, the electrical parameters detected by the battery sensor 136 can be provided as vehicle battery signals to the communication path 108 or any component communicatively coupled thereto.

The vehicle 102 can comprise a fuel sensor 138 for measuring the amount of fossil fuel (e.g., gasoline) contained within a fuel tank of the vehicle 102. The fuel sensor 138 can be any sensor suitable for detecting parameters that can be correlated to volume. For example, the fuel sensor 138 can comprise a float that is disposed within the fuel tank and that moves according to fuel level. The float can cooperate with an electrical component such as, for example, a potentiometer, magneto-resistance sensor, or the like. Alternatively or additionally, the fuel sensor 138 can be configured to detect electrical parameters (e.g., capacitance, dieletectric constant) of the fuel or parameters of the fuel tank (e.g., pressure) directly. The fuel sensor 138 can be communicatively coupled to the communication path 108. Accordingly, the parameters detected by the fuel sensor 138 can be provided as vehicle fuel signals to the communication path 108 or any component communicatively coupled thereto.

The vehicle 102 can comprise a distance sensor 140 for measuring distances traveled by the vehicle 102. The distance sensor 140 can be an electrical device, a mechanical device, or a combination thereof such as, for example, an odometer, a global positioning system, or the like. In some embodiments, the distance sensor 140 can be configured to count wheel 142 rotations and correlate the number of wheel 142 rotations into a distance. The distance sensor 140 can be communicatively coupled to the communication path 108. Accordingly, the distance detected by the distance sensor 140 can be provided as vehicle distance signals to the communication path 108 or any component communicatively coupled thereto.

Referring still to FIG. 1, the smart notification system 100 can comprise a mobile communication device 150 such as, for example, a smart phone, a tablet device, or the like with functionality for wireless data communications. The mobile communication device 150 can comprise a mobile processor 152 communicatively coupled to mobile memory 154. As used herein, the term "mobile," when modifying the terms "processor" or "memory," can mean configured for operation using a mobile operating system. Accordingly, in some embodiments, the mobile communication device 150 can be a device having a processor that executes instructions utilizing a mobile operating system. The mobile operating system can be any operating system designed primarily for touch screen mobile devices such as, for example, Android, iOS, Blackberry OS, Windows Phone, MP WebOS, Symbian OS, Palm OS, or the like.

The mobile communication device 150 can comprise mobile communication hardware 156 for communicating data wirelessly. The mobile communication hardware 156 can comprise cellular hardware for transmitting and receiving information via a cellular network and network communication hardware for transmitting and receiving information via a local area network, a personal area network, or the like. The cellular hardware can include components configured to encode data and decode data for communication via a cellular network. Accordingly, the cellular hardware can comprise cellular modem module and cellular transceiver module. The network communication hardware can include components configured to encode data and decode data for communication via a local area network or a personal area network, which are described in greater detail above. The mobile communication hardware 156 can be communicatively coupled to the mobile processor 152, the mobile memory 154, or both. Thus, any components of the mobile communication device 150 can utilize one or more components of the mobile communication hardware 156 to transmit signals over the Internet or World Wide Web.

The mobile communication device 150 can comprise a mobile display 158 for emitting optical signals to depict images. The mobile display 158 can be communicatively coupled to the mobile processor 152, the mobile memory 154, or both. As used herein, the term "display" can mean any medium capable of transmitting optical output such as, for example, a cathode ray tube, light emitting diodes, liquid crystal displays, plasma displays, or the like. The mobile communication device 150 can further comprise physical input 160 for sensing physical commands from a user. In some embodiments, the mobile display 158 can be configured as a touch screen that, in addition to providing optical information, detects the presence and location of a tactile input upon a surface of or adjacent to the mobile display 158. Accordingly, the mobile display 158 can receive mechanical input directly upon the optical output provided by the mobile display 158 and operate in a manner analogous to the physical input. In some embodiments, physical input 160 can comprise input hardware such as, for example, a button, a switch, a knob, a microphone, accelerometer, a camera, or the like. The physical input 160 can be communicatively coupled to the mobile processor 152, the mobile memory 154, or both. Accordingly, manipulation of the physical input 160 can be digitized into a data signal that can be transmitted to a vehicle component.

Referring still to FIG. 1, the smart notification system 100 can comprise a wearable processing device 200. The wearable processing device 200 can comprise a wearable component 210 and an electronic component 230. Generally, the wearable component can be any article of clothing or accessory that is configured to be worn by a user such as, for example, shirt, a jacket, a watch, eye glasses, head band or the like. The electronic component 230 can comprise a wearable processor 232 communicatively coupled to wearable memory 234. As used herein, the term "wearable," when modifying the terms "processor" or "memory," can mean configured for operation using a wearable operating system. Accordingly, in some embodiments, the wearable processing device 200 can be a device having a processor that executes instructions utilizing a wearable operating system. The wearable operating system can be any operating system designed primarily for wearable devices such as, for example, Android Wear, Tizen, Watch OS, Pebble OS, or the like.

The electronic component 230 can comprise wearable communication hardware 236 for communicating data wirelessly. The wearable communication hardware 236 can comprise network communication hardware for transmitting and receiving information via a local area network, a personal area network, or the like. Alternatively or additionally, the wearable communication hardware 236 can comprise cellular hardware for transmitting and receiving information via a cellular network. The wearable communication hardware 236 can be communicatively coupled to the wearable processor 232, the wearable memory 234, or both. It is noted that, in some embodiments, the electronic component 230 of the wearable processing device 200 can be distinguished from the mobile communication device 150 by reduced capabilities and smaller form factors. For example, the wearable communication hardware 236 can be implemented without cellular hardware. Alternatively or additionally, the electronic component 230 of the wearable processing device 200 can be implemented as a system-on-chip to reduce the overall size of the wearable processing device 200.

The electronic component 230 can comprise a wearable display 238 for emitting optical signals to depict images upon the wearable processing device 200. The wearable display 238 can be communicatively coupled to the wearable processor 232, the wearable memory 234, wearable communication hardware 236, or combinations thereof. The electronic component 230 can further comprise physical input 240 for sensing physical commands from a user. In some embodiments, the wearable display 238 can be configured as a touch screen that operates as physical input 240.

Accordingly, manipulation of the physical input 240 can be digitized into a command signal that can be provided to the wearable processor 232, transmitted by the wearable communication hardware 236, or both.

The electronic component 230 can comprise a biometric sensor 242 for detecting physiological characteristics of a user of the wearable processing device 200. The biometric sensor 242 can be any sensor suitable for detecting physiological parameters of a human such as, for example, a heart rate sensor. The biometric sensor 242 can be communicatively coupled to the wearable processor 232, the wearable memory 234, wearable communication hardware 236 or combinations thereof. Accordingly, the physiological characteristics detected by the biometric sensor 242 can be provided as biometric signals to the wearable processor 232, transmitted as biometric signals by the wearable communication hardware 236, or both.

Figure 2:
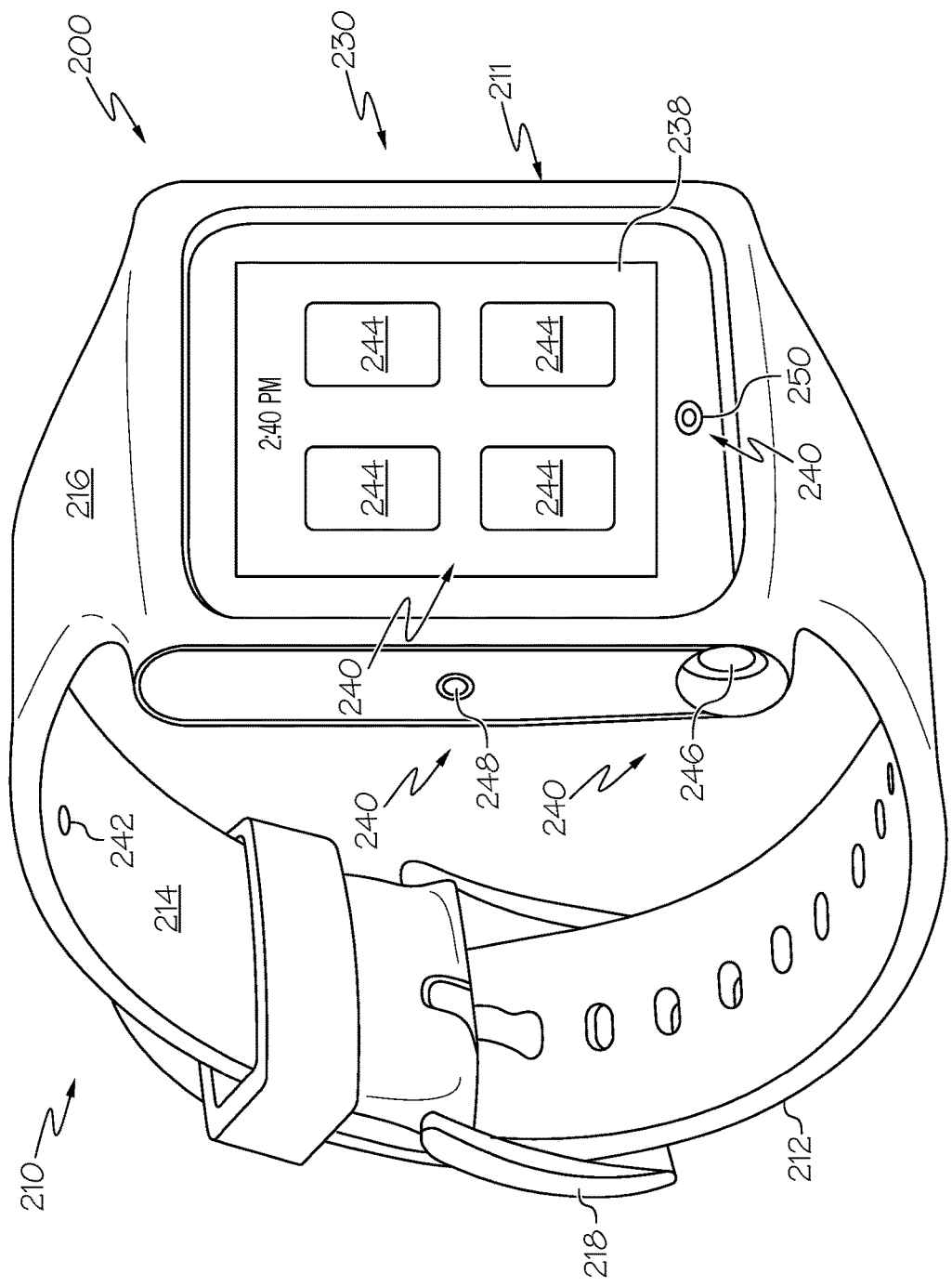
FIG. 2 schematically depicts a wearable processing device according to one or more embodiments shown and described herein.

Referring collectively to FIGS. 1 and 2, the wearable component 210 of the wearable processing device 200 can comprise a watch face 211 and a watch band 212. The watch face 211 can be coupled to or integral with the watch band 212. The watch band 212 can comprise a contact surface 214 for making contact with the arm of the user, and a visible surface 216 that is substantially visible when the wearable processing device 200 is worn by the user. In some embodiments, the biometric sensor 242 can be disposed on the contact surface 214 such that the biometric sensor 242 makes direct contact with the skin of the user, when the wearable processing device 200 is worn by the user. In some embodiments, the watch band 212 can be configured to be secured to the arm of a user, i.e., the contact surface 214 of the watch band 212 can be configured to form a durable enclosure that at least partially surrounds the arm of the user. Specifically, the watch band 212 can comprise a retention member 218 that secures the durable enclosure such as, for example, a clasp, a hook, a magnet, or the like.

In some embodiments, the electronic component 230 can be incorporated into the watch face 211 such that the wearable display 238 is not obscured while the wearable component 210 is secured to the user. Specifically, the wearable display 238 can be provided at the watch face 211 to provide the time and additional functionality. For example, the physical input 240 can be provided and can be configured to receive commands such as, for example, tactile input, voice commands, gestures, or the like.

In some embodiments, touch screen objects 244 can be provided upon the wearable display 238. Each touch screen object 244 can be configured to receive tactile input such as, for example, one or more tap, directional swipe (i.e., up, down, left, right, or combinations thereof), or the like. For example, the touch screen object 244 can be provided with other graphical objects to communicate a notification via the wearable display 238. The graphical objects can provide further information that details the correlation between commands and specific types of tactile input. Alternatively or additionally, the physical input 240 can comprise an input member 246 that can be manipulated to input commands to the wearable processing device 200 such as, for example, a switch, a button, a roller, or the like. Alternatively or additionally, the physical input 240 can comprise a microphone 248 for receiving voice commands. As is noted above, the wearable processing device 200 can be configured to receive commands in the form of gestures. Accordingly, the physical input 240 can comprise a camera 250 for receiving gestures, i.e., hand waving, facial expressions, or the like. Specifically, the camera can be an optical input device that captures images, which can be transformed into command signals.

Figure 3:
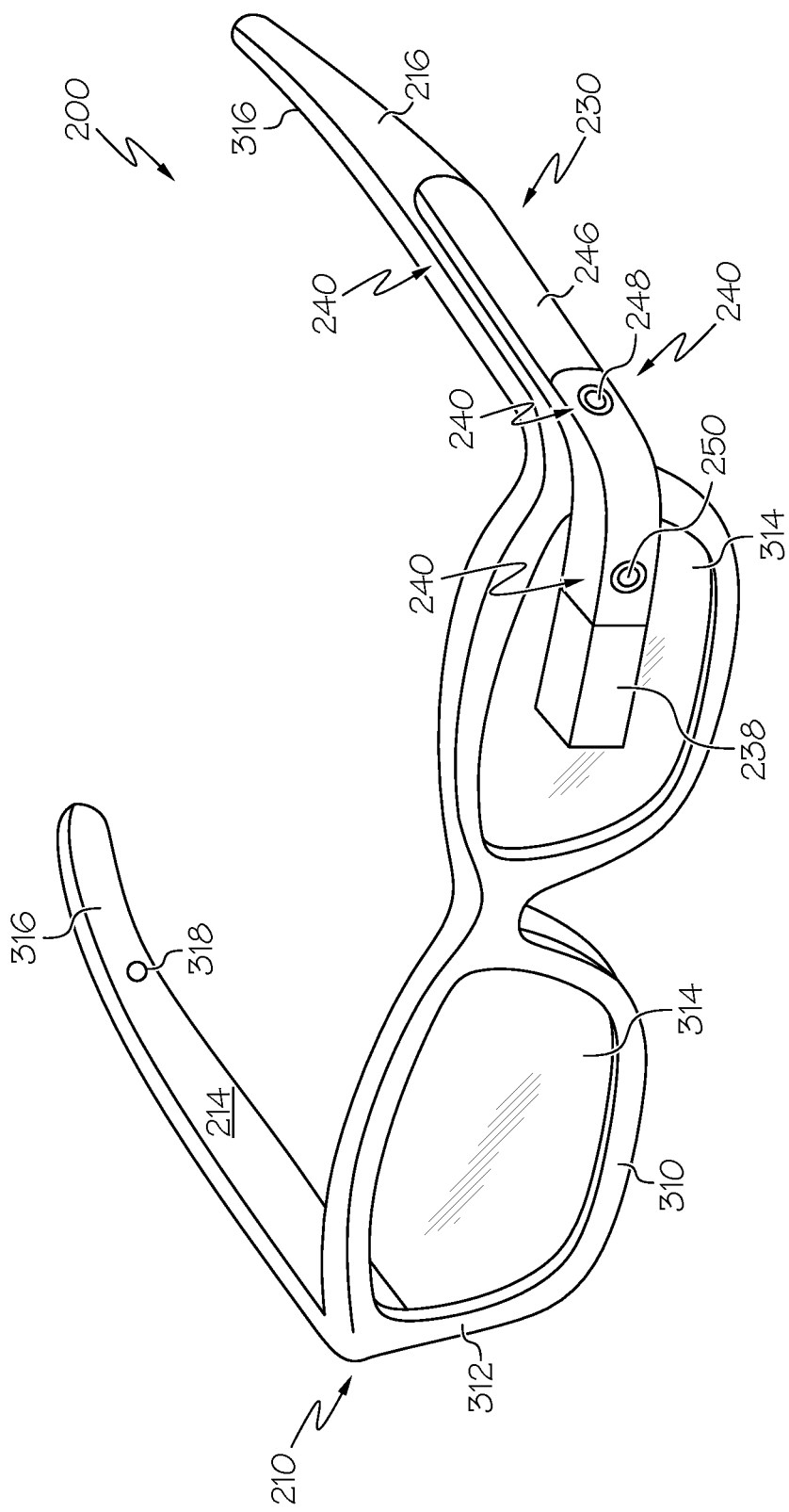
FIG. 3 schematically depicts a wearable processing device according to one or more embodiments shown and described herein.

Referring collectively to FIGS. 1 and 3, the wearable component 210 of the wearable processing device 200 can comprise eye glasses 310. The eye glasses 310 can comprise a frame 312 that is configured to be worn on the head of the user and lenses 314 that are aligned with the eyes of the user when the frame 312 is supported on the user's head. In some embodiments, the frame 312 can comprise temple members 316 that are configured to interact with the ears of the user. The frame 312 can comprise a contact surface 214 for making contact with the head of the user, and a visible surface 216 that is substantially visible when the eye glasses 310 are worn by the user.

The electronic component 230 can be incorporated into the frame 312 such that the wearable display 238 is aligned with one of the lenses 314. Accordingly, when the wearable processing device 200 is worn by the user, the wearable display 238 can be substantially aligned with an eye of the user. In some embodiments, electronic component 230 can comprise an output device 318 (e.g., speaker or transducer) that is communicatively coupled to the wearable processor 232. The output device 318 can be disposed on the contact surface 214 such that the output device 318 makes direct contact with the skin of the user, when the wearable processing device 200 is worn by the user. The electronic component 230 can further comprise physical input 240 arranged along the frame 312 of the eye glasses 310. For example, the electronic component 230 can comprise one or more of an input member 246 configured to receive tactile input, a microphone 248 for receiving voice commands, and a camera 250 for receiving gestures.

Referring again to FIG. 1, the smart notification system 100 can comprise the vehicle 102, the mobile communication device 150, and the wearable processing device 200. The vehicle 102 can be communicatively coupled to the mobile communication device 150, which can be communicatively coupled to the wearable processing device 200. Specifically, the vehicle communication hardware 110 can be communicatively coupled to the mobile communication hardware 156, and the mobile communication hardware can be communicatively coupled to the wearable communication hardware 236. Data signals can be exchanged between the vehicle 102, the mobile communication device 150, and the wearable processing device 200 using, for example, one or more of a cellular network, a local area network, and a personal area network. Accordingly, the vehicle 102 can be indirectly communicatively coupled to the wearable processing device 200 via the mobile communication device 150. In alternative embodiments, the vehicle 102 and the wearable processing device 200 can be directly communicatively coupled, i.e., the vehicle communication hardware 110 can be communicatively coupled to the wearable communication hardware 236. Data signals can be exchanged between the vehicle 102 and the wearable processing device 200 using, for example, one or more of a cellular network, a local area network, and a personal area network.

Figure 4:
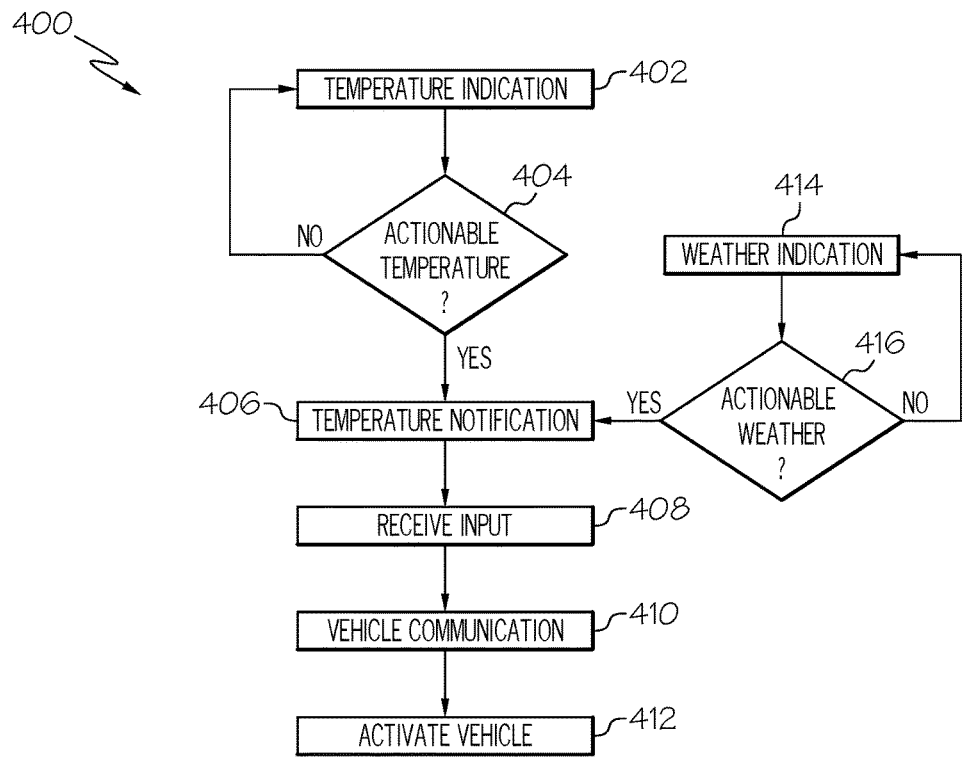
FIG. 4 schematically depicts a smart notification method according to one or more embodiments shown and described herein.

Referring collectively to FIGS. 1 and 4, when the vehicle 102, the mobile communication device 150, and the wearable processing device 200 are communicatively coupled, the vehicular processor 104, the mobile processor 152, and the wearable processor 232 can cooperate with one another to perform the methods described herein. When the vehicle 102 and the wearable processing device 200 are communicatively coupled, the vehicular processor 104 and the wearable processor 232 can cooperate with one another to perform the methods described herein. When the processors perform the methods cooperatively, the processes of the method can be distributed amongst the processors. The processes can be synchronized by sending and/or receiving data, as described herein. It should be understood that, while individual processes may be described herein as being performed by a specific processor or device, the processes can be performed by any communicatively coupled processor or device without departing from the scope of the embodiments described herein.

Figure 5:
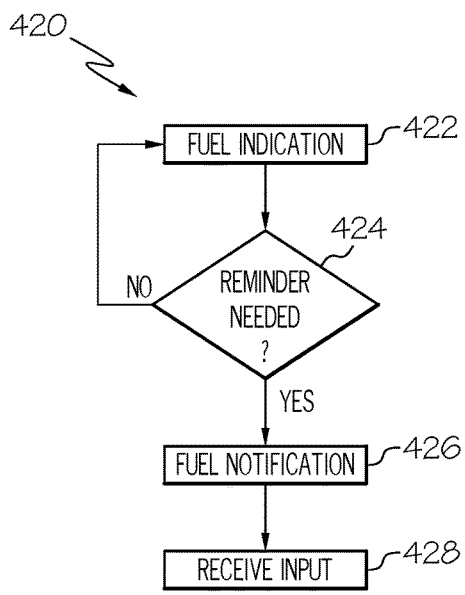
FIG. 5 schematically depicts a smart notification method according to one or more embodiments shown and described herein.
Figure 6:
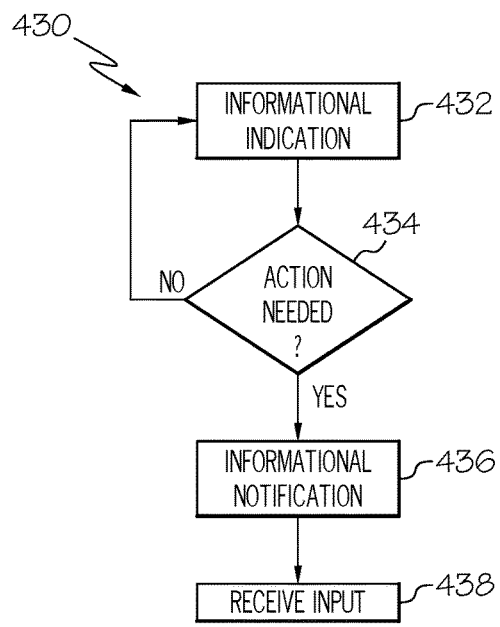
FIG. 6 schematically depicts a smart notification method according to one or more embodiments shown and described herein.

Referring collectively to FIGS. 4-6, flow charts are provided which schematically depict sequences of processes for smart notification methods 400, 420, 430. It is noted that, while the processes are enumerated and depicted as being performed in a particular sequence, the processes can be performed in an alternative order without departing from the scope of the present disclosure. It is furthermore noted that one or more of the processes can be omitted without departing from the scope of the embodiments described herein.

Referring again to FIGS. 1 and 4, a smart notification method 400 can comprise a process 402 for monitoring the ambient temperature of the vehicle 102. Specifically, the ambient temperature of the vehicle can be detected with the temperature sensor 122. As is noted above, the temperature sensor 122 can detect the temperature within the passenger compartment of the vehicle 102, the temperature surrounding the vehicle 102, or a combination thereof. For example, the temperature sensor 122 can comprise one or more sensors, and the vehicular processor 104 can evaluate the detected temperature to determine a temperature indication. The process 402 can operate periodically or can operate at discrete instances (e.g., when a temperature indication is requested or when the vehicle 102 is idle).

At process 404, the temperature indication can be evaluated to determine whether further action is needed. In some embodiments, further action may be required when the temperature indication exceeds a maximum desired temperature. Specifically, the maximum desired temperature can be a temperature correlated to passenger compartment comfort levels, or to the cooling capabilities of the HVAC system 120 within set period of time. In order to determine the set period of time, temporal information indicative of when the user is likely to use the vehicle 102 can be provided to the smart notification method 400. For example, the smart notification method 400 can access calendar data from calendar applications from the mobile communication device 150 or the wearable processing device 200. Based on such temporal information, the process 404 can determine that the affirmative condition is met. Thus, remedial action can be taken to reduce the temperature prior to the passenger compartment being occupied. Accordingly, the process 404 can achieve an affirmative condition ("YES"), when the temperature indication is greater than the maximum desired temperature.

Alternatively or additionally, further action may be required when the temperature indication is less than a minimum desired temperature. Analogous to the maximum desired temperature, the minimum desired temperature can be a temperature correlated to passenger compartment comfort levels, or to the heating capabilities of the HVAC system 120 within set period of time. Thus, the process 404 can achieve an affirmative condition, when the temperature indication is less than the minimum desired temperature. In instances where the temperature indication is less than the maximum desired temperature, greater than the minimum temperature, or both, the negative condition ("NO") can be met. When the process 404 achieves the negative condition, the smart notification method 400 can proceed to process 402. When the process 404 achieves the affirmative condition, the smart notification method 400 can proceed to process 406.

At process 406, a temperature notification can be provided via the wearable processing device 200. In some embodiments, vehicle data that is indicative of the temperature indication can be communicated to the wearable processing device 200 directly from the vehicle 102 or indirectly from the vehicle 102 via the mobile communication device 150. The wearable processing device 200 can be configured to receive the vehicle data and automatically provide the temperature notification. For example, the wearable processor 232 can implement a notification process that is configured to receive vehicle data. Upon the vehicle data being received, the temperature notification can be provided. Specifically, the temperature notification can be presented upon the wearable display 238. The temperature notification can include visual object that is indicative of the temperature indication (i.e., too hot, too cold, etc.).

At process 408, the wearable processing device 200 can receive command input from a user that is indicative a vehicular action to remedy the temperature notification. Specifically, the wearable processing device 200 can provide control options based upon the vehicle data. For example, if the temperature inside the passenger compartment is too hot, control options for cooling the vehicle 102 can be provided such as, for example, opening windows 132, opening sunroof 134, running the blower fan of the HVAC system 120, or the like. Similarly, if the temperature inside the passenger compartment is too cold, control options for heating the vehicle 102 can be provided such as, for example, closing windows 132, closing sunroof 134, running the heater of the HVAC system 120 to heat the passenger compartment and/or defrost the windshield, or the like. In some embodiments, the control options can be placed on the top level of the temperature notification. Accordingly, command input can be provided by tactile input upon the wearable display 238. For example, swipe up to close windows 132 or swipe down to open windows 132. Alternatively or additionally, the physical input 240 can receive command input such as, for example, tactile input, voice commands or gestures.

At process 410, a command signal indicative of the command detected by the physical input 240 of the wearable processing device 200 can be received with the vehicle communication hardware 110. In some embodiments, the command signal can be communicated to the vehicle 102 directly from the wearable processing device 200 or indirectly from the wearable processing device 200 via the mobile communication device 150. The command signal can be encoded such that the command signal corresponds to vehicular action. Accordingly, the vehicle communication hardware 110, the vehicular processor 104, or both can decode the command signal to extract the desired vehicular action. Upon determining the vehicular action, the smart notification method 400 can proceed to process 412.

At process 412, the vehicular processor can automatically operate components of the vehicle 102 according the vehicular action. For example, the vehicular processor 104 can cause any window actuator 130 to operate to open or close one or more windows 132 or the sunroof 134. Alternatively or additionally, the vehicular processor 104 can operate the HVAC system to heat or cool the passenger compartment of the vehicle 102.

Referring still to FIGS. 1 and 4, the smart notification method 400 can comprise a process 414 for monitoring weather conditions surrounding the vehicle 102. Specifically, the humidity sensor 124 can be utilized to detect humidity level or the light sensor 126 can be utilized to detect level of lighting in the environment surrounding the vehicle 102. Alternatively or additionally, the vehicle 102 can be provided with a weather service that provides information regarding future or current weather conditions surrounding the vehicle 102. The humidity level, level of lighting, weather conditions, or combinations thereof can be provided as a weather indication. The process 414 can operate periodically or can operate at discrete instances (e.g., when a temperature indication is requested or when the vehicle 102 is idle).

At process 416, the weather indication can be evaluated to determine whether further action is needed. In some embodiments, further action may be required when the weather indication corresponds to a precipitation event e.g., snow, rain, sleet, etc. In instances where the weather indication corresponds to a precipitation event, it can also be determined whether any of the windows 132, sunroof 134 or vents of the HVAC system 120 are open. If a precipitation event is not indicated, all of the windows 132, sunroof 134 or vents of the HVAC system 120 are closed, or both no remedial action may be needed. When no remedial action is needed, the process 416 can achieve a negative condition and proceed to process 414.

If a precipitation event is indicated and any of the windows 132, sunroof 134 or vents of the HVAC system 120 are open, remedial action can be taken to close the opened components to prevent precipitation from entering the passenger compartment of the vehicle 102. Accordingly, the process 416 can achieve an affirmative condition and proceed to process 406. In some embodiments, the visual object of the temperature notification can be indicative of the weather indication.

Referring collectively to FIGS. 1 and 5, a smart notification method 420 can comprise a process 422 for monitoring the fuel level of the vehicle 102. Specifically, the fuel level of the vehicle 102 can be detected with the fuel sensor 138. Alternatively or additionally, the fuel level of the vehicle 102 can be detected with the battery sensor 136. The process 422 can operate periodically or can operate at discrete instances (e.g., when a trip is planned or at a time prior to commute). Accordingly, a fuel indication that is indicative of the fuel level can be provided to process 424.

At process 424, the fuel indication can be evaluated to determine whether further action is needed. In some embodiments, further action may be required when the fuel indication is less than a desired level of fuel. In some embodiments, the desired level of fuel can correspond to a relatively low range of the vehicle 102 compared to a desired destination. In order to determine the desired destination, the smart notification method 420 can access calendar data from the mobile communication device 150 or the wearable processing device 200, or GPS data. Optionally, the fuel range can be determined based upon fuel economy trends, which can be monitored by the vehicular processor 104 using data provided by the battery sensor 136, the fuel sensor 138 and the distance sensor 140. When the fuel indication is less than the desired level of fuel, remedial action can be taken to reduce to increase the level of fuel in the vehicle 102. Accordingly, the process 424 can achieve an affirmative condition, and proceed to process 426. When the fuel indication is greater than a desired level of fuel, the smart notification method 420 can proceed to process 422.

At process 426, a fuel notification can be provided via the wearable processing device 200. In some embodiments, vehicle data that is indicative of the fuel indication can be communicated to the wearable processing device 200 directly from the vehicle 102 or indirectly from the vehicle 102 via the mobile communication device 150. The wearable processing device 200 can be configured to automatically provide the fuel notification. Specifically, the fuel notification can be presented upon the wearable display 238, and can include a visual object that is indicative of the fuel indication. Accordingly, the fuel notification can remind the user to leave earlier for appointments, when the fuel level is running low, so as to have enough time to add fuel to the vehicle. Additionally, the fuel notification can prompt the user to add more fuel to the vehicle 102 if longer trips are scheduled. Upon providing the fuel notification, the smart notification method 420 can proceed to process 428. At process 428, the wearable processing device 200 can receive command input from a user to clear the fuel notification or reset the fuel notification.

Referring collectively to FIGS. 1 and 6, a smart notification method 430 can comprise a process 432 for monitoring diagnostic information of the vehicle 102 such as, for example, engine performance, preferred and current tire pressure, model year, mileage, fault codes, or the like. The process 432 can operate periodically or can operate at discrete instances (e.g., at scheduled maintenance intervals). Accordingly, an informational indication that is indicative of the diagnostic information can be provided to process 434.

At process 434, the informational indication can be evaluated to determine whether further action is needed. In some embodiments, further action may be required when the information indication corresponds to a predetermined maintenance interval or a component failure. Accordingly, the process 434 can achieve an affirmative condition, and proceed to process 436. When no maintenance is needed, the smart notification method 430 can proceed to process 432.

At process 436, an informational notification can be provided via the wearable processing device 200. In some embodiments, vehicle data that is indicative of the informational indication can be communicated to the wearable processing device 200 directly from the vehicle 102 or indirectly from the vehicle 102 via the mobile communication device 150. The wearable processing device 200 can be configured to automatically provide the informational notification. Specifically, the informational notification can be presented upon the wearable display 238. The informational notification can include a visual object that prompts the user on scheduled maintenance, issues with the vehicle 102 (such as low tire pressure) and needed repairs. Upon providing the informational notification, the smart notification method 430 can proceed to process 438. At process 438, the wearable processing device 200 can receive command input from a user to clear the informational notification.

It should now be understood that the embodiments described herein relate to the use of wearable processing devices to improve the operation of a vehicle. In some embodiments, the wearable processing device can be worn by a user in manner such that the wearable processing devices are more quickly accessible than, for example, smart phones. Specifically, a user can quickly perform actions such as responding to notifications without having to locate, unlock and navigate the menu of a smart phone. Moreover, the wearable processing devices can extend and improve the functionality of the vehicle. For example, vehicle HVAC system performance can be improved by allowing additional time mitigate extreme temperature conditions without a user being present. Additionally, fuel notifications can be utilized to avoid delay. Moreover, maintenance reminders can be more easily accessed by users.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a processor;
   a temperature sensor communicatively coupled to the processor;
   a memory communicatively coupled to the processor; and
   machine readable instructions stored in the memory that cause the system to perform at least the following when executed by the processor:
   monitor a temperature within a vehicle with the temperature sensor;
   determine a temperature limit at least based on cooling or heating capabilities of the vehicle and temporal information related to a user of the vehicle;
   determine a need for further action based on a comparison of the temperature within the vehicle and the temperature limit;
   provide a notification of the need for the further action in response to determining the need for the further action; and
   receive a command signal initiating the further action in response to providing the notification.

2. The system of claim 1, wherein the processor executes the machine readable instructions to operate one or more components of the vehicle according to the further action, wherein the one or more components includes at least one of a window actuator and a heating ventilation and cooling system.

3. The system of claim 1, further comprising a light sensor communicatively coupled to the processor, wherein the processor executes the machine readable instructions to monitor a level of lighting in an environment surrounding the vehicle with the light sensor, and determine the need for further action based on the level of lighting.

4. The system of claim 1, wherein the vehicle comprises a window actuator communicatively coupled to the processor and operable to open or close a window or a sunroof, and wherein the processor executes the machine readable instructions to cause the window actuator to open or close the window or the sunroof.

5. The system of claim 1, wherein the vehicle comprises a heating ventilation and air conditioning (HVAC) system communicatively coupled to the processor, and wherein the processor executes the machine readable instructions to cause the HVAC system to heat or cool a passenger compartment of the vehicle.

6. The system of claim 1, wherein the processor executes the machine readable instructions to monitor weather conditions surrounding the vehicle, and determine that the weather conditions correspond to a precipitation event.

7. The system of claim 6, wherein the vehicle comprises a window actuator communicatively coupled to the processor and operable to open or close a window or a sunroof, and wherein the processor executes the machine readable instructions to cause the window actuator to close the window or the sunroof in response to determining that the weather conditions correspond to the precipitation event.

8. The system of claim 1, wherein the processor executes the machine readable instructions to:
   monitor a fuel level of the vehicle; and
   provide a fuel notification indicative of the fuel level of the vehicle.

9. The system of claim 1, wherein the processor executes the machine readable instructions to:
   monitor diagnostic information of the vehicle; and
   provide an informational notification indicative of the diagnostic information of the vehicle.

10. A computer-implemented method comprising:
    monitoring a temperature within a vehicle with a temperature sensor;
    determining a temperature limit at least based on cooling or heating capabilities of the vehicle and temporal information related to a user of the vehicle;
    determining a need for further action based on a comparison of the temperature within the vehicle and the temperature limit;
    providing a notification of the need for the further action in response to determining the need for the further action; and
    receiving a command signal initiating the further action in response to providing the notification.

11. The method of claim 10, further comprising operating one or more components of the vehicle according to the further action, wherein the one or more components includes at least one of a window actuator and a heating ventilation and cooling system.

12. The method of claim 10, further comprising
    monitoring a level of lighting in an environment surrounding the vehicle with a light sensor; and
    determining the need for further action based on the level of lighting.

13. The method of claim 10, further comprising:
    monitoring a fuel level of the vehicle; and
    providing a fuel notification indicative of the fuel level of the vehicle.

14. The method of claim 10, further comprising:
    monitoring diagnostic information of the vehicle; and
    providing an informational notification indicative of the diagnostic information of the vehicle.

15. A vehicle comprising:
    a processor;
    a temperature sensor communicatively coupled to the processor;
    a memory communicatively coupled to the processor;
    at least one of a window actuator and a heating ventilation and cooling (HVAC) system communicatively coupled to the processor; and
    machine readable instructions stored in the memory that cause the vehicle to perform at least the following when executed by the processor:
    monitor a temperature within the vehicle with the temperature sensor;
    determine a temperature limit at least based on cooling or heating capabilities of the vehicle and temporal information related to a user of the vehicle;

determine a need for further action based on a comparison of the temperature within the vehicle and the temperature limit;

provide a notification of the need for the further action in response to determining the need for the further action;

receive a command signal initiating the further action in response to providing the notification; and automatically operate the at least one of the window actuator and the HVAC system according to the further action.

16. The vehicle of claim 15, wherein the at least one of the window actuator and the HVAC system comprises the window actuator, the vehicle further comprising a window or a sunroof, wherein:

the window actuator is operable to open or close the window or the sunroof; and the processor executes the machine readable instructions to cause the window actuator to open or close the window or the sunroof.

17. The vehicle of claim 15, wherein the at least one of the window actuator and the HVAC system comprises the HVAC system, wherein the processor executes the machine readable instructions to cause the HVAC system to heat or cool a passenger compartment of the vehicle.

18. The vehicle of claim 15, wherein the processor executes the machine readable instructions to monitor weather conditions surrounding the vehicle and determine that the weather conditions correspond to a precipitation event.

19. The vehicle of claim 15, wherein the at least one of the window actuator and the HVAC system comprises the window actuator, the vehicle further comprising a window or a sunroof, wherein the processor executes the machine readable instructions to cause the window actuator to close the window or the sunroof in response to determining that the weather conditions correspond to the precipitation event.

20. The vehicle of claim 15, further comprising a light sensor communicatively coupled to the processor, wherein the processor executes the machine readable instructions to monitor a level of lighting in an environment surrounding the vehicle with the light sensor, and determine the need for further action based on the level of lighting.

* * * * *

UNITED STATES PATENT AND TRADEMARK OFFICE
CERTIFICATE OF CORRECTION

| | | |
|---|---|---|
| PATENT NO. | : 10,081,347 B2 | Page 1 of 1 |
| APPLICATION NO. | : 15/281664 | |
| DATED | : September 25, 2018 | |
| INVENTOR(S) | : Samuel T. Haberl and Charan Lota | |

It is certified that error appears in the above-identified patent and that said Letters Patent is hereby corrected as shown below:

In Page 2, References Cited, Item (56), U.S. Patent Documents, Citation 8,341,971 B2, US classification, delete "236/10" and insert --236/1C--, therefor.

In Column 7, Line 4, delete "dieletectric constant" and insert --dielectric constant--, therefor.

Signed and Sealed this
Twentieth Day of November, 2018

Andrei Iancu
*Director of the United States Patent and Trademark Office*